Dec. 24, 1940.   G. WESTEFELDT   2,226,273
PISTON SEAL
Filed June 28, 1937
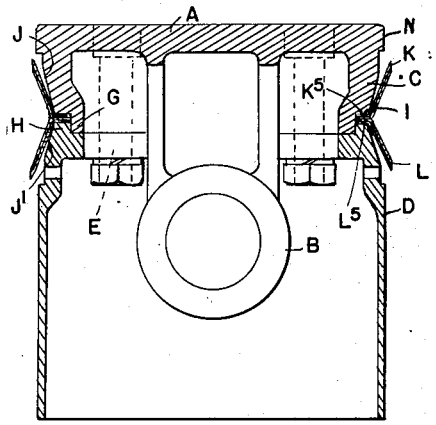
FIG.1.
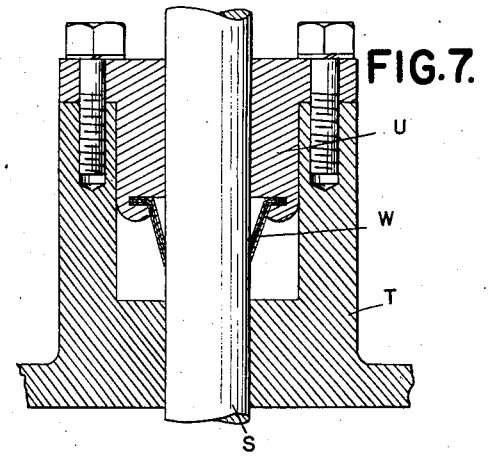
FIG.7.
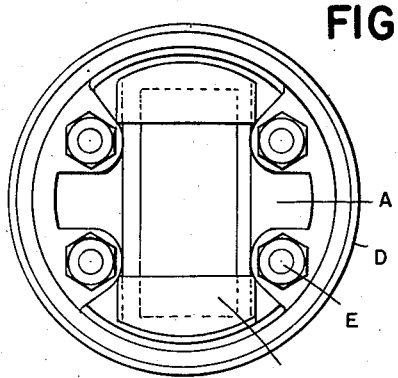
FIG.2.
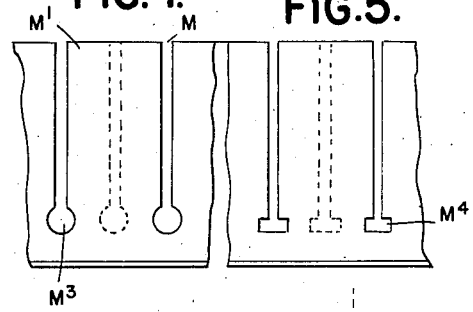
FIG.4.   FIG.5.
FIG.6.
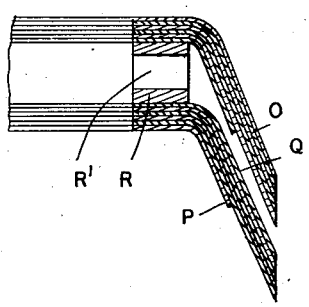
FIG.3.
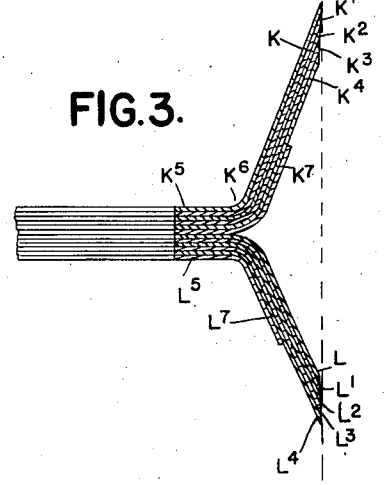
INVENTOR
GEORGE WESTEFELDT
BY
Whittemore Hulbert & Belknap
ATTORNEYS Patented Dec. 24, 1940

2,226,273

UNITED STATES PATENT OFFICE 2,226,273

PISTON SEAL

George Westefeldt, Lochmoor Village, Mich.

Application June 28, 1937, Serial No. 150,865

3 Claims. (Cl. 309—33)

The invention relates to sealing means between relatively movable members, such as cylinders and pistons, and forms a continuation in part of my former application, Serial No. 753,706 filed November 19, 1934 now Patent No. 2,088,357 issued July 27, 1937. It is the object of the invention to obtain a construction which can be manufactured at low cost and which when applied to a piston or similar device will maintain an effective seal throughout the life thereof. The invention therefore consists in the construction for accomplishing such objects as hereinafter set forth.

In the drawing:

Figure 1 is a vertical central section through a piston to which my improved sealing means is applied;

Figure 2 is a bottom plan view thereof;

Figure 3 is a cross section on an enlarged scale through the sealing means;

Figure 4 is a side elevation thereof;

Figure 5 is a similar view showing a slightly modified construction;

Figure 6 is a view showing a construction designed for use as an oil ring;

Figure 7 is a section of the sealing means as applied to a stuffing box.

As described in my earlier filed application, my improved sealing means consists essentially of two oppositely facing series of nested cups formed of thin resilient metal, said cups being individually slotted in a radial direction to form a series of tongues and the slots in adjacent cups being staggered or out of registration. Each of the segments between slots is therefore free to press in contact with the wall of the cylinder or cooperating member and can conform to any irregularities therein. Furthermore, by forming the cups of a peripheral diameter slightly greater than the diameter of the cylinder into which they are introduced they will be flexed and placed under compression. The pressure against the cylinder wall may also be very accurately predetermined by properly proportioning the parts so that this pressure may be reduced to the minimum required for an effective seal.

As shown in Figures 1 and 2, the piston is formed of a head portion A which has integral therewith the wrist pin bearings B and a relatively short skirt portion C. D is a complementary separately formed skirt portion which is attached to the head portion A by means of bolts or rivets E passing through registering apertures in the two parts. The skirt portion D is held in axial alignment with the head portion A by telescopically engaged annular flanges G and H. The flange H is of lesser length than the flange G so as to form an annular recess I and adjacent to this recess on the two members are the oppositely inclined portions J and J'. These together form a V-shaped groove for receiving the sealing means which is of the following construction.

$K$, $K'$, $K^2$, $K^3$ and $K^4$ are nested cups formed of relatively thin resilient metal having inner portions $K^5$ which are in planes perpendicular to the axis of the piston and flaring flange portions connecting with the portions $K^5$ by curved portions $K^6$. $L$, $L'$, $L^2$, $L^3$ and $L^4$ are similar nested cups with their flaring flange portions extending in the opposite direction. These cups are individually formed of suitable resilient and preferably corrosion resisting material, such as stainless steel, which may be of a suitable thickness depending upon the size of the piston. The flanges of the cups are further provided with radially extending slots M which divide the same into a series of spring tongues M'. The inner ends of the slots are enlarged either by a round aperture $M^3$, as shown in Figure 4, or a rectangular aperture $M^4$, as shown in Figure 5. This has the effect of reducing the width of the tongues at their inner ends and rendering these portions more flexible. The nested cups are so fashioned as to lie parallel and in contact with each other and with the slots in one out of registration with those in the adjacent cup. The peripheral diameters are initially somewhat greater than the diameter of the cylinder in which they are placed and are ground to form contact with the cylinder wall throughout their width. Inasmuch as the successive lengths of the inclined flanges of the cups vary and also because the curved portions $K^6$ vary in radius, they will not all contract to the same extent when forced into the cylinder. Therefore, to compensate for this the peripheral edges are not initially ground to be parallel with the axis throughout the series, but on the contrary are inclined to this axis for a small amount, as for instance an angle of two degrees. As a result when the cups are contracted within the cylinder the peripheral edges of the series will be parallel to the cylinder wall and in full contact therewith. The angle of flare of the cups may vary between the limits of 10° and 45°, but preferably is within the smaller limits of 20° and 25°.

The sealing means constructed as thus far described will be effective not only for holding compression and explosion pressures, but also for suction and against the pumping of oil. This would not be the case if cups inclining in one direction only were used, as these could only effectively seal for the movement of the piston in one direction. However, with the reverse series the seal will remain effective throughout the entire reciprocating movement of the piston. The cups are held in position by clamping the portions $K^5$ and $L^5$ in the groove I between the portions C and D. The upwardly directed cups are also protected from the heat of combustion by an annular portion N of the head A which closely fits the cylinder above said cups and forms a shield therefor.

Under conditions of operation involving high pressures and high speed, there is a tendency for the cups K, K', etc., to buckle, thereby permitting escape of gases past the periphery thereof. To avoid such result I preferably employ an unslotted reinforcing cup $K^7$ which is below the nested series and which extends for a portion of the radial length thereof. The cups of the lower series L, L', etc., are not subjected to such high pressures and, therefore, such reinforcement is unnecessary. However, I preferably place a cup $L^7$ within the nested series to assist in tensioning the same to resist the passage of oil. This cup $L^7$ extends for only a part of the length of the flanges of the cups L, L', etc., and is also slotted but with a fewer number of slots and consequently wider tongues of greater tension.

The modification shown in Figure 6 is a construction designed for use solely as an oil ring. In this two series of nested cups O and P are arranged with their conical flanges extending in the same direction and with a space Q therebetween formed by a spacer ring R between the clamping portions. Apertures R' in this spacer permit the escape of any oil which passes the lower series of cups and enters the space Q.

My improved sealing means may also be used in place of a stuffing box for sealing about a shaft. Such construction is shown in Figure 7 in which S is a shaft or cylindrical stem; T a stuffing box; U a gland and W a series of nested cups secured to said gland. These glands have inwardly extending conical flanges, the peripheral edges of which contact with the surface of the shaft S with a predetermined resilient pressure. The construction is otherwise the same as that previously described.

What I claim as my invention is:

1. The combination with telescopically engaging relatively reciprocating members, of sealing means therebetween comprising a plurality of nested resilient cups formed of substantially non-compressible material and connected to one of said members, each cup having a conical flange portion at an angle between 10° and 45° to the axis of the cup, said flange being slotted from its periphery inward to form a series of flexible resilient tongues with the slots in adjacent cups out of registration, said cups being flexed and contracted in diameter when engaged with the cooperating member to exert a resilient tension thereon and form a sealing contact therewith, and the peripheral edges of the series when disengaged from the cooperating member lying in the surface of a cone.

2. The combination with a cylinder and a piston therein, of sealing means comprising a plurality of nested cups formed of substantially non-compressible material, each cup having a conical flange portion at an angle between 10° and 45° to the axis of the cup, said flange being slotted from its periphery inward to form a series of flexible resilient tongues, the slots in adjacent cups being out of registration, said cups being mounted in said piston and slightly flexed and contracted in diameter when engaged with the cylinder to exert a resilient tension thereon and form a sealing contact therewith, the peripheral edges of the series when disengaged from the cylinder lying in the surface of a cone.

3. The combination with a cylinder and a piston therein, of sealing means comprising a plurality of nested cups formed of substantially non-compressible material, each cup having a conical flange portion at an angle between 10° and 45° to the axis of the cup, said flange being slotted from its periphery inward to form a series of flexible resilient tongues, the slots in adjacent cups being out of registration, said cups being mounted in a groove in said piston and slightly flexed and contracted in diameter when engaged with said cylinder to exert a resilient tension thereon and form a sealing contact therewith, the peripheral edges of the series when disengaged from said cylinder lying in the surface of a cone at an angle approximately 2° to the axis and a cup having an unslotted conical flange of lesser radial length forming a reinforcement for the series to prevent buckling thereof.

GEORGE WESTEFELDT.